No. 623,107. Patented Apr. 11, 1899.
JOHN RIDDETT & JAMES RIDDETT.
DRIVING MECHANISM FOR BICYCLES.
(Application filed Apr. 9, 1897.)

(No Model.)

WITNESSES:

INVENTORS.
John Riddett
James Riddett
BY
Edgar Tate & Co
ATTORNEYS.

UNITED STATES PATENT OFFICE.

JOHN RIDDETT AND JAMES RIDDETT, OF YONKERS, NEW YORK, ASSIGNORS TO HENRY C. ENGLAND, OF READING, PENNSYLVANIA.

DRIVING MECHANISM FOR BICYCLES.

SPECIFICATION forming part of Letters Patent No. 623,107, dated April 11, 1899.

Application filed April 9, 1897. Serial No. 631,348. (No model.)

*To all whom it may concern:*

Be it known that we, JOHN RIDDETT and JAMES RIDDETT, citizens of the United States, residing at Yonkers, in the county of Westchester and State of New York, have invented certain new and useful Improvements in Driving Mechanism for Bicycles and Similar Vehicles, of which the following is a full and complete specification, such as will enable those skilled in the art to which it appertains to make and use the same.

This invention relates to the driving mechanism of bicycles and similar vehicles; and the object thereof is to provide improved mechanism for this purpose whereby the usual drive-chain is dispensed with and the driving-wheel of the crank-shaft and the driven wheel on the axle of the bicycle drive-wheel are geared through an intermediate transmitting-wheel;
and with this and other objects in view the invention consists in the construction, combination, and arrangement of parts hereinafter described and claimed.

Figure 1:
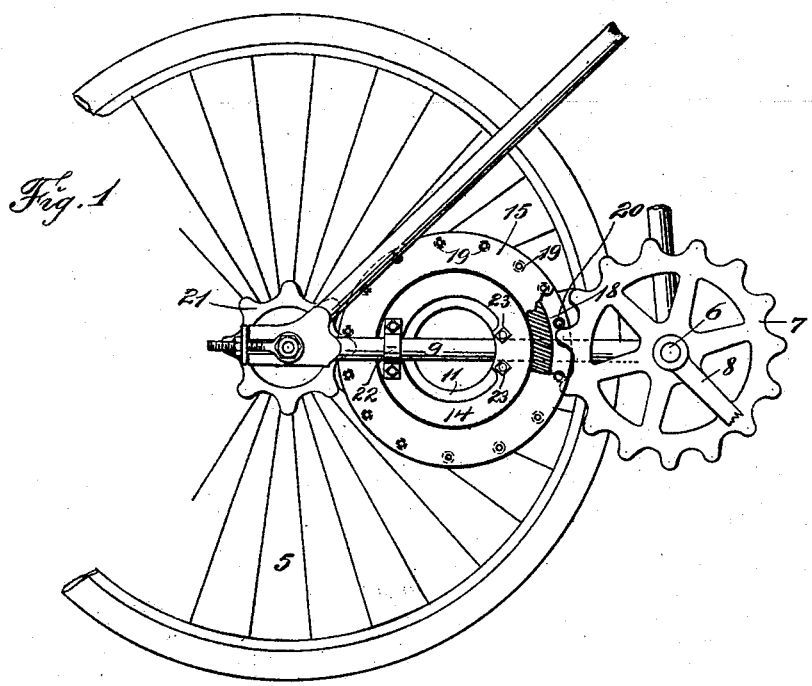
Figure 2:
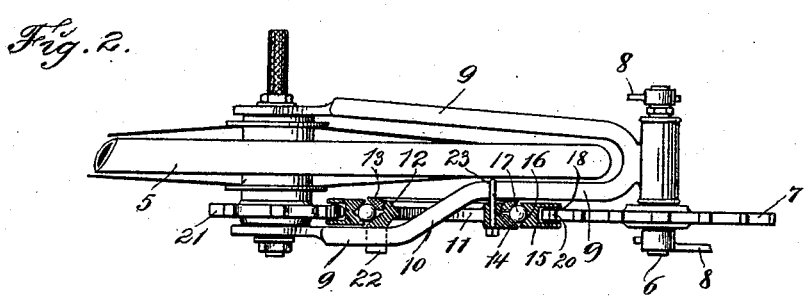

The invention is fully disclosed in the following specification, of which the accompanying drawings form a part, in which the separate parts of our improvement are designated by the same numerals of reference in each of the views, and in which—
Figure 1 is a side view of a portion of a bicycle or similar vehicle, showing our improved driving mechanism, part of the construction being shown in section; and Fig. 2, a sectional plan view thereof.
In the drawings forming part of this specification we have shown at 5 the drive-wheel of a bicycle, and at 6 the crank-shaft, on which is mounted the driving-wheel 7, and we have also shown at 8 the pedal-cranks or parts thereof, and at 9 the side rods or frame-bars of the frame, which extend from the support of the drive-wheel axle to the crank-hanger which supports the crank-shaft. One of these frame-bars 9 is bent laterally at or near the center thereof, as shown at 10, and in practice we secure to this frame-bar a ring 11, which is composed of an outer and an inner part, the outer part being provided with an inwardly-directed flange or rim 12, to which is secured by means of a screw-thread or otherwise a detachable supplemental ring 13, and the outer ring 11 and the supplemental detachable ring 13, which forms a part thereof, are provided with an annular groove 14, and mounted thereon is an intermediate transmitting-wheel 15, which is provided in its inner perimeter with an annular groove 16, which corresponds with the groove 14 in the ring 11, and in the space formed by the annular grooves 14 and 16 are placed ball-bearings 17.

The wheel 15 is provided in its outer perimeter with a deep annular groove 18, and mounted in said annular groove 18 at regular intervals are transverse pins or bolts 19, on which are mounted rollers 20, and the pins 19 and said rollers 20, mounted thereon, serve as teeth, and in the operation of the gear the teeth on the driving-wheel 7 of the pedal-shaft engage with the teeth in the annular groove 18 of the wheel 15, and said teeth in wheel 15 engage with the teeth on the driven wheel 21, which is mounted on the shaft or axle of the bicycle drive-wheel 5.

The ring 11 is connected with the laterally-bent rod 9 of the frame by means of a keeper 22, secured to one side thereof, through which the outer portion of said rod 9 is passed, and by a corresponding keeper at the opposite side of said ring, of which the rods 23 form a part.

It will be understood that the ring 11 is stationary and that the wheel 15 revolves around the same, and the operation will be readily understood from the foregoing description when taken in connection with the accompanying drawings and the following statement thereof.

The crank-shaft 6 is operated by the pedal-crank 8 in the usual manner and the driving-wheel 7 revolves therewith, and this operation of the driving-wheel 7 revolves the transmitting-wheel 15 on the stationary ring 11, and the transmitting-wheel 15 operates the sprocket-wheel 21 and the drive-wheel 5, on the shaft or axle of which the sprocket-wheel 21 is mounted.

Our invention is not limited to the means herein described for securing the ring 11 to the frame of the vehicle, and it will also be understood that in order to connect the wheel

15 with the ring 11 and to place the ball-bearings 17 in position the supplemental detachable ring 13 must be disconnected from the ring 11, and after the wheel 15 and the ball-bearings 17 are placed in position said ring 13 is again secured in place.

This device is simple in construction and operation and is perfectly adapted to accomplish the result for which it is intended, and it will be observed that the driving-wheel 7 on the crank-shaft is not larger than such driving-wheels when employed in connection with the ordinary drive-chain.

By means of our improved gearing we decrease the friction to a minimum and gear the driving-wheel of the crank-shaft in direct connection with the driven wheel of the drive-wheel of the vehicle, and we dispense with the drive-chain, which is complicated in construction and frequently breaks.

Having fully described our invention, we claim as new and desire to secure by Letters Patent—

1. In a bicycle having a continuous frame-bar from the crank-hanger to the rear-wheel axle, a driving-wheel at the crank-hanger, a driven wheel at the rear-wheel axle, and a transmitting-ring through which the frame-bar passes engaging the driving and driven wheels, substantially as described.

2. In a bicycle having a laterally-bent continuous frame-bar from the crank-hanger to the rear-wheel axle, a driving-wheel at the crank-hanger, a driven wheel at the rear-wheel axle and an intermediate transmitting-wheel through which the laterally-bent portion of the frame-bar passes engaging with the driving and driven wheels, substantially as described.

In testimony that we claim the foregoing as our invention we have signed our names, in presence of the subscribing witnesses, this 3d day of April, 1898.

JOHN RIDDETT.
JAMES RIDDETT.

Witnesses:
FRANK BONESTEEL,
EUGENE ALEX. HOUSTON.